US006992281B2

(12) United States Patent
Abou-Shakra et al.

(10) Patent No.: US 6,992,281 B2
(45) Date of Patent: Jan. 31, 2006

(54) MASS SPECTROMETER

(75) Inventors: Fadi Abou-Shakra, Sale (GB); Andrew Eaton, Altrincham (GB); Andrew Entwistle, Manchester (GB); Heather Walker, Sheffield (GB)

(73) Assignee: Micromass UK Limited, Manchester (GB)

( * ) Notice: Subject to any disclaimer, the term of this patent is extended or adjusted under 35 U.S.C. 154(b) by 0 days.

(21) Appl. No.: 10/426,827

(22) Filed: May 1, 2003

(65) Prior Publication Data

US 2004/0026610 A1 Feb. 12, 2004

Related U.S. Application Data

(60) Provisional application No. 60/380,303, filed on May 15, 2002.

(30) Foreign Application Priority Data

May 1, 2002 (GB) .................................... 0209972
May 14, 2002 (GB) .................................... 0210991

(51) Int. Cl.
*B01D 59/44* (2006.01)
*H01J 49/00* (2006.01)

(52) U.S. Cl. ....................................... 250/281; 250/282

(58) Field of Classification Search ................ 250/281, 250/282
See application file for complete search history.

(56) References Cited

U.S. PATENT DOCUMENTS 5,049,739 A * 9/1991 Okamoto .................... 250/281
5,767,512 A * 6/1998 Eiden et al. ................ 250/282
6,627,912 B2 * 9/2003 Bandura et al. ............ 250/582
6,630,665 B2 * 10/2003 Tanner et al. ............... 250/306

FOREIGN PATENT DOCUMENTS

| | | |
|---|---|---|
| DE | 44 14 403 A1 | 10/1994 |
| EP | 0 453 808 A1 | 10/1991 |
| WO | 93/08589 | 4/1993 |
| WO | WO 98/56030 | 12/1998 |
| WO | WO 00/16375 | 3/2000 |
| WO | 01/01446 | 1/2001 |
| WO | WO 03/009332 A1 | 1/2003 |

OTHER PUBLICATIONS

Bateman et al., "A Novel Precursor Ion Discovery Method on a Hybrid Quadrupole Orthogonal Acceleration Time-of-Flight (Q-TOF) Mass Spectrometer for Studying Protein Phosphorylation", Journal of American Society Mass Spectrometry, vol. 13, pp. 792-803, 2002.

* cited by examiner

*Primary Examiner*—John R. Lee
*Assistant Examiner*—Paul M. Gurzo
(74) *Attorney, Agent, or Firm*—Diederiks & Whitelaw PLC

(57) ABSTRACT

An Inductively Coupled Plasma ("ICP") mass spectrometer is disclosed comprising a mass filter and a reaction/collision cell. Analyte ions and background ions having the same nominal mass to charge ratio are transmitted by the mass filter. The analyte ions selectively react with gas in the reaction/collision cell to form product ions having different mass to charge ratios. By measuring the intensity of the product ions the intensity of the analyte ions can be determined. According to less preferred embodiments background ions may be neutralised or reacted in the reaction/collision cell.

23 Claims, 2 Drawing Sheets

MASS SPECTROMETER

CROSS-REFERENCE TO RELATED APPLICATION

The present application claims the benefit of U.S. Provisional Patent Application Ser. No. 60/380,303, filed May 15, 2002.

BACKGROUND OF THE INVENTION

1. Field of the Invention

The present invention relates to a mass spectrometer and a method of mass spectrometry.

2. Discussion of the Prior Art

Inductively Coupled Plasma mass spectrometry (ICP-MS) is commonly used for trace element analysis. A number of different forms of ICP-MS systems are known.

Quadrupole ICP-MS is a high throughput system that offers a limited mass to charge ratio resolution capability typically $(m/z)/\Delta(m/z)$ equal to 400. High resolution ICP-MS uses a combination of electrostatic and magnetic sectors in order to significantly increase the mass to charge resolution up to about $(m/z)/\Delta(m/z)$ equal to 10000.

Time of Flight ICP-MS is a variant of the low resolution ICP-MS system wherein a Time of Flight mass analyser is used instead of a quadrupole mass analyser in order to achieve high speed acquisition. Reaction/collision cell ICP-MS is another variant of the quadrupole ICP-MS system wherein a reaction/collision cell is provided prior to the quadrupole mass analyser in order to achieve selective reduction of spectroscopic interferences. Ion trap ICP-MS is a yet further variant of the low resolution ICP-MS system wherein an ion trap mass analyser is used instead of a quadrupole mass analyser in order to achieve a greater control over the reduction of spectroscopic interferences through gas molecule reactions.

A significant problem with the known mass spectrometers is that the detection limits of a number of elements analysed by quadrupole and Time of Flight ICP-MS systems are limited by spectroscopic interferences.

An example of particular interest is Phosphorus which is a mono-isotopic element that can be detected as $P^+$ ions having a nominal mass to charge ratio of 31. At the same nominal mass interfering molecular ions such as $NOH^+$, $^{13}C^{18}O^{30}$, $C^{18}OH^+$, $^{13}COH_2^+$ and $COH_3^+$ are also often observed. The intensity of the interfering molecular ions may be particularly high especially when solvents rich in nitrogen, oxygen or carbon are used. This inevitably leads to poor detection limits for Phosphorus.

Although it is possible using high resolution ICP-MS to resolve the above mentioned interferences, this is generally at the expense of sensitivity. Furthermore, high resolution ICP-MS systems are relatively large and expensive.

It is known to attempt to address the problem of interferences using reaction/collision cell ICP-MS systems. Instead of separating analyte and interference ions based on their mass to charge ratio differences, gases are added to a reaction/collision cell to provide a means for separating analyte ions from interfering ions based upon their energy differences. The ions formed in the plasma have different energies from molecular ions formed elsewhere or reaction by-products formed in the reaction/collision cell. Therefore, by using the reaction/collision cell in an energy-filtering mode it is possible to separate plasma ions from other ions. Whilst this approach does offer some improvement in detection limits compared with standard quadrupole ICP-MS systems, the energy difference approach often results in a substantial loss of sensitivity.

Ion trap ICP-MS systems can be used to refine the control of the reaction processes required to separate interfering ions from analyte ions. However, due to the storage limitations of ion traps these systems have a relatively low sensitivity particularly when the population of the analyte ions is very small compared with the interfering ions For example, Phosphorus and Sulphur are particularly difficult to detect when organic solvents are used since interferences are normally particularly intense.

SUMMARY OF THE INVENTION

According to the present invention there is provided a mass spectrometer comprising:

an Inductively Coupled Plasma ("ICP") ion source for generating ions;

a mass filter arranged downstream of the ion source, wherein in use the mass filter is arranged to substantially transmit atomic ions having a first mass to charge ratio and to substantially attenuate other ions having mass to charge ratios which fall within a first range which does not include the first mass to charge ratio;

a reaction cell arranged downstream of the mass filter wherein the atomic ions react in use with a gas to form product ions) and a mass analyser downstream of the reaction cell, wherein the mass analyser analyses in use the product ions and a determination of the intensity of the atomic ions is made from the mass analysis of the product ions.

The phrase "Inductively Coupled Plasma ion source" is intended to include ion sources wherein plasmas are generated by microwaves.

The mass filter upstream of the reaction cell preferably comprises a quadrupole mass filter although other types of mass filter may be used.

The preferred embodiment is particularly suitable for determining the intensity of $P^+$, $S^+$, $F^+$, $Cl^+$, $V^+$, $As^+$, $Sr^+$, $Tc^+$ and/or $Pu^+$ atomic ions generated by the ICP ion source.

Although background ions having mass to charge ratios different from those which are arranged to be transmitted by the mass filter are substantially attenuated by the mass filter, other background ions having mass to charge ratios substantially equal to the first mass to charge ratio are also transmitted by the mass filter. However, when the product ions are mass analysed the determined intensity of the product ions will be substantially due to the product ions since the background ions having the same mass to charge ratio as is the analyte ions will not have reacted with the gas in the reaction cell in the same way. Accordingly, the product ions being mass analysed will be substantially free from interfering ions.

The product ions formed according to the preferred embodiment preferably have a mass to charge ratio which falls within the first range i.e. they have mass to charge ratios which would not be transmitted by the mass filter. Therefore, ions generated in the plasma ion source or anywhere upstream of the mass filter will not interfere with the product ions since they are preferably not transmitted by the mass filter. Accordingly, when the product ions are mass analysed the determined intensity of the product ions will substantially correspond with the product ions and the determined intensity will be substantially unaffected by interference ions.

The reaction/collision cell preferably comprises a multipole ion guide such as a quadrupole, hexapole, octopole or higher order multipole ion guide. According to other embodiments the reaction cell comprises a plurality of electrodes having apertures through which ions are transmitted in use e.g. an ion tunnel or ion funnel ion guide. The reaction cell may also comprise a segmented rod set. Preferably, the reaction/collision cell is arranged in a gas containment sleeve. Gas is preferably provided into the reaction/collision cell at a pressure selected from the group consisting of; (i) $10^{-4}$–$10^{-2}$ mbar; (ii) $10^{-4}$–$10^{-3}$ mbar; (iii) $10^{-3}$–$10^{-2}$ mbar; (iv) approximately $2\times10^{-3}$ mbar; and (v) $1.0$–$5.0\times10^{-3}$ mbar. According to other embodiments the reaction/collision cell may be maintained at pressures $>10^{-4}$ mbar, $>10^{-3}$ mbar, $>10^{-2}$ mbar, $>10^{-1}$ mbar, >1 mbar, >10 mbar or >100 mbar. The gas may comprise oxygen, hydrogen, $C_2H_2$ or COS (carbonyl sulphide). Other gases may also be used.

The product ions preferably comprise molecular ions although according to less preferred embodiments the product ions may comprise atomic ions.

According to a particularly preferred embodiment the atomic ions which are desired to be analysed comprise $P^+$ ions having a nominal mass to charge ratio of 31. According to this embodiment the mass filter upstream of the reaction/collision cell is set to transmit only ions having mass to charge ratios of 31. The gas present in the reaction/collision cell is arranged to comprise oxygen with the result that the product ions which are formed in the reaction/collision cell will comprise $PO^+$ ions having a mass to charge ratio of 47. Potentially interfering $NO_2H^+$ ions formed in the ion source which also have the same nominal mass to charge ratio as $PO^+$ ions are however substantially attenuated by the mass filter upstream of the reaction/collision cell and hence do not substantially interfere with the mass analysis of the $PO^+$ ions. As is discussed below in more detail, it is known that the reaction wherein $P^+$ ions react with oxygen to form $PO^+$ ions is nearly 100% efficient and hence the measured intensity of the $PO^+$ ions gives an effective and accurate indication of the intensity of $P^+$ ions present in the sample being analysed.

Other embodiments are contemplated wherein either; (i) the atomic ions to be analysed comprise $Cl^+$, the reaction gas comprises hydrogen and the product ions formed comprise $ClH_2^+$; (ii) the atomic ions to be analysed comprise $S^+$, the reaction gas comprises oxygen and the product ions formed comprise $SO^+$; (iii) the atomic ions to be analysed comprise $S^+$, the reaction gas comprises hydrogen and the product ions formed comprise $SH^+$; (iv) the atomic ions to be analysed comprise $S^+$, the reaction gas comprises $C_2H_z$ and the product ions formed comprise $HC_2S^+$; (v) the atomic ions to be analysed comprise $V^+$, the reaction gas comprises oxygen and the product ions formed comprise $VO^+$; (vi) the atomic ions to be analysed comprise $As^+$, the reaction gas comprises oxygen and the product ions formed comprise $AsO^+$; (vii) the atomic ions to be analysed comprise $F^+$, the reaction gas comprises oxygen and the product ions formed comprise $OF^+$; (viii) the atomic ions to be analysed comprise $F^+$, the reaction gas comprises hydrogen and the product ions formed comprise $FH^+$; or (ix) the atomic ions to be analysed comprise $F^+$, the reaction gas comprises COS (carbonyl sulphide) and the (atomic) product ions formed comprise $S^+$.

According to a preferred embodiment of the present invention there is provided a mass spectrometer comprising:

an Inductively Coupled Plasma ("ICP") ion source for generating ions;

a mass filter arranged downstream of the ion source, wherein in use the mass filter is arranged to substantially transmit $P^+$ ions having a mass to charge ratio of 31 and to substantially attenuate $NO_2H^+$ ions having a mass to charge ratio of 47;

a reaction cell arranged downstream of the mass filter wherein the $P^+$ ions react in use with oxygen to form $PO^+$ ions; and a mass analyser downstream of the gas reaction cell, wherein the mass analyzer analyses in use the $PO^+$ ions and a determination of the intensity of the $P^+$ ions is made from the mass analysis of the $PO^+$ ions.

According to another aspect of the present invention there is provided a mass spectrometer, comprising:

an Inductively Coupled Plasma ("ICP") ion source for generating ions;

a mass filter arranged downstream of the ion source, wherein in use the mass filter is arranged to substantially transmit atomic ions and background ions having substantially the same first mass to charge ratio and to substantially attenuate other ions having mass to charge ratios which fall within a first range which does not include the first mass to charge ratio;

a reaction cell arranged downstream of the mass filter wherein the background ions react in use with a gas to form neutral particles; and a mass analyser downstream of the reaction cell for mass analysing the atomic ions.

The preferred features described above in relation to the other aspect of the present invention apply equally to this aspect of the present invention.

According to another aspect of the present invention there is provided a mass spectrometer comprising:

an Inductively Coupled Plasma ("ICP") ion source for generating ions;

a mass filter arranged downstream of the ion source, wherein in use the mass filter is arranged to substantially transmit atomic ions and background ions having substantially the same first mass to charge ratio and to substantially attenuate other ions having mass to charge ratios which fall within a first range which does not include the first mass to charge ratio;

a reaction cell arranged downstream of the mass filter wherein the background ions react in use with a gas to form product ions; and a mass analyser downstream of the gas reaction cell for mass analysing the atomic ions.

The preferred features described above in relation to the other aspect of the present invention apply equally to this aspect of the present invention.

According to another aspect of the present invention there is provided a method of mass spectrometry, comprising:

passing ions emitted from an Inductively Coupled Plasma ("ICP") ion source to a mass filter;

arranging the mass filter to substantially transmit atomic ions having a first mass to charge ratio and to substantially attenuate other ions having mass to charge ratios which fall within a first range which does not include the first mass to charge ratio;

reacting the atomic ions with a gas to form product ions;

mass analysing the product ions; and determining the intensity of the atomic ions from the mass analysis of the product ions.

According to another aspect of the present invention there is provided a method of mass spectrometry, comprising:

passing ions emitted from an Inductively Coupled Plasma ("ICP") ion source to a mass filter;

arranging the mass filter to substantially transmit $P^+$ ions having a mass to charge ratio of 31 and to substantially attenuate $NO_2H^+$ ions having a mass to charge ratio of 47;

reacting the $P^+$ ions transmitted by the mass filter with oxygen in an ion guide so as to form $PO^+$ ions; and mass analysing the $PO^+$ ions.

According to another aspect of the present invention there is provided a method of mass spectrometry, comprising:

passing ions emitted from an Inductively Coupled Plasma ("ICP") ion source to a mass filter;

arranging the mass filter to substantially transmit atomic ions and background ions having substantially the same first mass to charge ratio and to substantially attenuate other ions having mass to charge ratios which fall within a first range which does not include the first mass to charge ratio;

reacting the background ions with a gas to form neutral particles; and mass analysing the atomic ions.

According to another aspect of the present invention there is provided a method of mass spectrometry, comprising:

passing ions emitted from an Inductively Coupled plasma ("ICP") ion source to a mass filter;

arranging the mass filter to substantially transmit atomic ions and background ions having substantially the same first mass to charge ratio and to substantially attenuate other ions having mass to charge ratios which fall within a first range which does not include the first mass to charge ratio;

reacting the background ions with a gas to form product ions; and mass analysing the atomic ions.

An advantage of the preferred embodiment is that low levels of analyte ions can be measured in the presence of intense isobaric interferences. The preferred embodiment is particularly suitable for detecting and measuring low levels of phosphorelated proteins through the analysis of Phosphorus. Furthermore, the preferred embodiment is also particularly suitable for quantifying detected proteins through the use of other heteroatoms such as Sulphur as internal standards.

The preferred embodiment comprises a quadrupole mass filter which is used to transmit ions having a specific mass to charge ratio. Many undesired background ions generated in the plasma will not be transmitted by the mass filter. However, the ions transmitted by the mass filter will include both the analyte ions of interest and any interfering ions having substantially the same nominal mass to charge ratio as the analyte ions of interest.

The ions transmitted by the mass filter then pass to a multipole ion guide, preferably a hexapole ion guide, which is used as a reaction/collision cell.

According to one embodiment any interfering ions having the same nominal mass to charge ratio as the analyte ions may be neutralised in the reaction cell. According to another embodiment any interfering ions having the same nominal mass to charge ratio as the analyte ions react with gas in the reaction cell to form product ions having a different mass to charge ratio to that of the analyte ions of interest which may not, for example, react with the gas in the reaction/collision cell or which may react differently with the gas in the reaction/collision cell compared to the interfering ions.

According to a particularly preferred embodiment the analyte ions of interest react with the gas in the reaction/collision cell to form product ions which have a different mass to charge ratio to that of the analyte ions and to any interfering ions having the same nominal mass to charge ratio as the analyte ions. Measuring the intensity of the product ions then enables the intensity of the analyte ions of interest which reacted with the gas in the reaction cell to be determined. The determination can be particularly accurate if the conversion efficiency of the reaction by which the product ions are formed is known or can be estimated. In many cases the conversion efficiency will be very high and hence mass analysing the product ions provides an effective determination of the intensity of the analyte ions of interest.

Ions in the multipole ion guide reaction/collision cell (either analyte ions or product ions) are then transmitted from the reaction/collision cell to a mass analyser such as a quadrupole, Time of Flight or magnetic sector based mass spectrometer. These ions are separated according to their mass to charge ratio and are detected by an ion detector.

Advantageously, the preferred embodiment enables analyte ions to be separated from interfering ions and/or enables the potential effect of interfering ions to be removed or significantly reduced without causing any significant loss in the analyte ion signal. Accordingly, the detection levels for these analytes is substantially improved. In particular the preferred embodiment enables detection limits for Phosphorus in the low fmol range to be achieved. This is a significant improvement over known ICP mass spectrometers and advantageously enables proteins to be screened as to whether or not they are phosphorylated.

Samples may be introduced to the ion source through direct infusion, through coupling to a chromatographic separation such as HPLC or CE or by laser ablation of Gels.

BRIEF DESCRIPTION OF THE DRAWINGS

Various embodiments of the present invention together with other arrangements given for illustrative purposes only will now be described, by way of example only, and with reference to the accompanying drawings in which.

DETAILED DESCRIPTION OF THE INVENTION

A preferred embodiment of the present invention will now be described. A plasma mass spectrometer is provided which comprises a plasma torch for generating ions from a sample introduced into the plasma. The ions emitted from the plasma ion source pass through a nozzle-skimmer interface into a vacuum chamber of the mass spectrometer. An ion optical device such as an ion guide may be provided for guiding the ions through the vacuum chamber. A quadrupole or other form of mass filter is provided downstream of the ion optical device and is arranged to transmit ions having specific mass to charge ratios. A further ion optical device such as an ion guide may be provided downstream of the mass filter for guiding the ions emerging from the mass filter. A multipole ion guide reaction/collision cell, preferably a hexapole, may be provided downstream of the mass filter. The reaction/collision cell is preferably maintained at a relatively high pressure so that ions are thermalised and undergo selective ion chemistry reactions in the reaction/collision cell. A yet further ion optical device such as a further ion guide may be provided for guiding ions emerging from the reaction/collision cell. Finally, a mass analyser, preferably a quadrupole mass filter and an ion detector, is provided for mass analysing the ions.

Figure 1A:
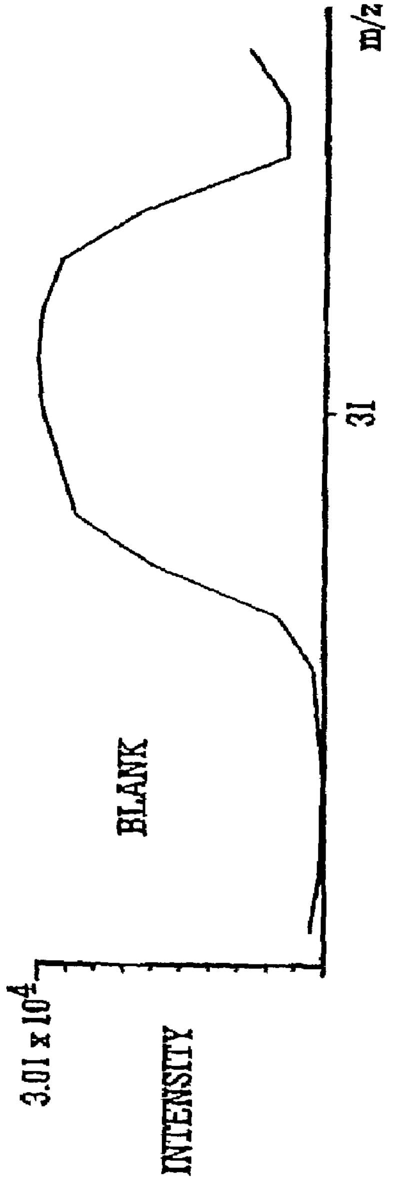
FIG. 1A shows a portion of a precursor ion mass spectrum at m/z=31 for a blank sample with no oxygen present in the reaction/collision cell and FIG. 1B shows a portion of a precursor ion mass spectrum at m/z=31 for a sample of 1 ppm Phosphorus with no oxygen present in the reaction/collision cell.
Figure 1B:
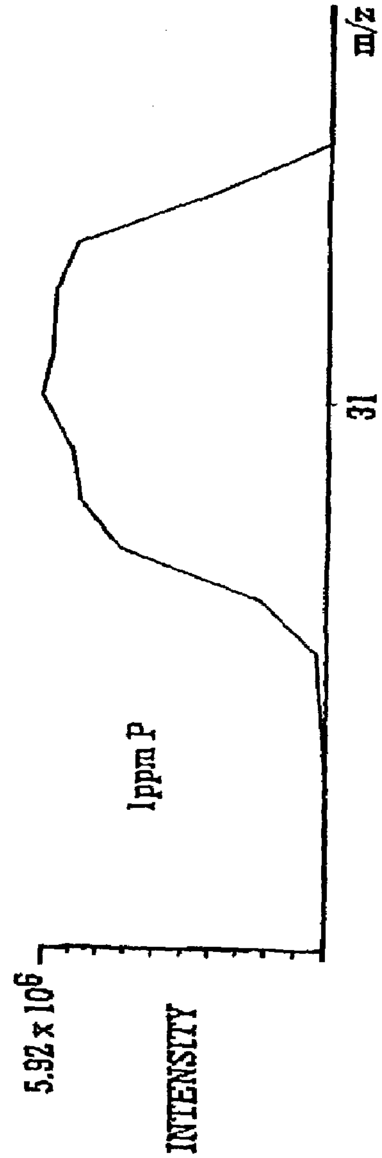

The preferred embodiment is particularly suitable for accurately determining the intensity of Phosphorus ions having a mass to charge ratio of 31 in an sample. However, in many instances it is not normally possible to accurately directly measure the intensity of Phosphorus ions due to the presence of particularly strong background interferences due to $NOH^+$ ions also having a nominal mass to charge ratio of 31. As can be seen from FIG. 1A the background count at mass to charge ratio 31 when a blank sample was mass analysed was approximately 30,000 cps (equivalent to approximately 5 ppb). This is believed to be primarily due to $NOH^+$ ions generated in the plasma ion source. The interference at mass to charge ratio 31 can be particularly acute when nitrogen containing matrices such as nitric acid, Acetonitrile and amino acids are used. FIG. 1B shows a mass peak observed at mass to charge ratio 31 when a sample comprising 1 ppm Phosphorus was mass analysed. The Phosphorus mass peak is about 200 times more intense than the background peak having nominally the same mass to charge ratio. The mass peaks shown in FIGS. 1A and 1B were both obtained when no oxygen was present in the gas reaction/collision cell.

Figure 2A:
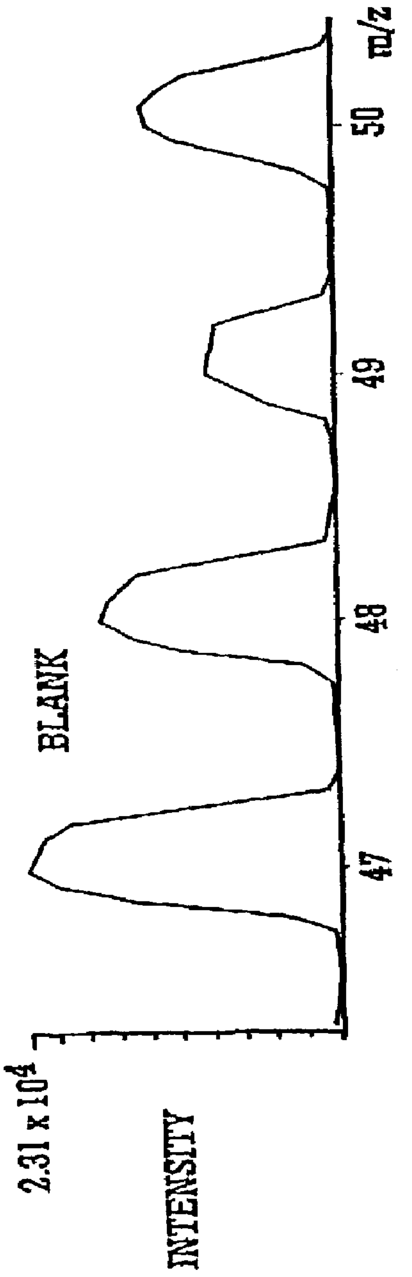
FIG. 2A shows a portion of a precursor ion mass spectrum at m/z 47–50 for a blank sample with no oxygen present in the reaction/collision cell and FIG. 2B shows a portion of a product ion mass spectrum at m/z 47–50 for a sample of 1 ppm Phosphorus with an upstream mass filter set to transmit ions having a mass to charge ratio of 31 and with oxygen present in the reaction/collision cell.
Figure 2B:
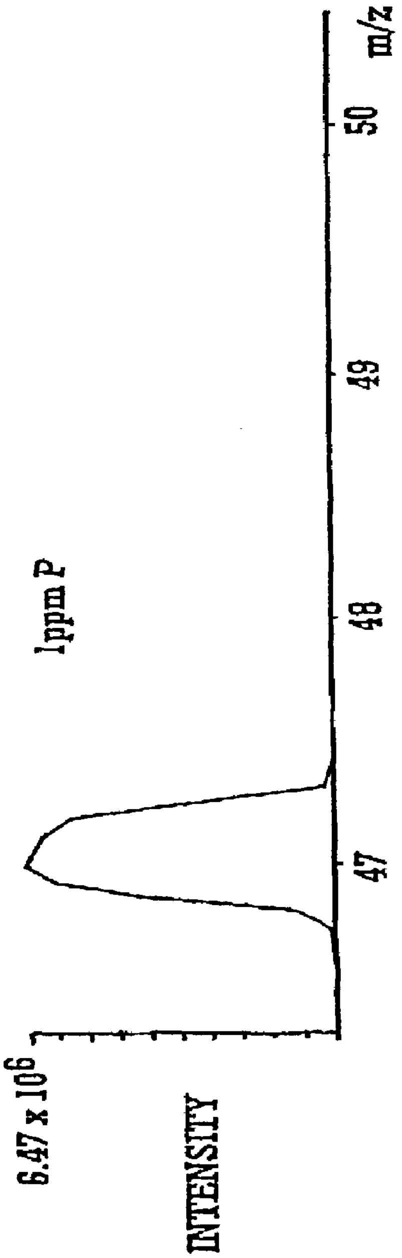

FIG. 2A shows a portion of a precursor ion mass spectrum obtained when a blank sample was mass analysed and when no oxygen was present in the reaction/collision cell. FIG. 2B shows a portion of a product ion mass spectrum obtained according to the preferred embodiment when a sample comprising 1 ppm Phosphorus was mass analysed and oxygen was present in the reaction/collision cell. In the case of the partial mass spectrum shown in FIG. 2B a mass filter upstream of the reaction/collision cell was set to transmit only ions having a mass to charge ratio of 31.

The gas phase reaction of $P^+$ ions with oxygen is very efficient:

$$P^+ + O_2 \rightarrow PO^+ + O$$

with $k=5.6\times10^{-10}$ $cm^3/s$ Therefore, by adding oxygen into the collision/reaction cell $P^+$ ions are selectively converted into $PO^+$ ions which are observed having a mass to charge ratio of 47.

The signal at mass to charge ratio 47 shown in FIG. 2B corresponding to $PO^+$ ions formed due to the reaction of $P^+$ ions with oxygen is similar in intensity to the signal at mass to charge ratio 31 shown in FIG. 1B which corresponds to unreacted $P^+$ ions. This further verifies that the conversion rate from $P^+$ ions to $PO^+$ ions in the presence of oxygen is nearly 100%.

In conventional mass spectrometers a background peak at mass to charge ratio 47 due to $NO_2H^+$ ions produced in the plasma would interfere with the measurement of $PO^+$ ions. However, according to the preferred embodiment the quadrupole mass filter upstream of the reaction/collision cell may be set to only transmit $P^+$ ions having a mass to charge ratio of 31 and hence the background interfering $NO_2H^+$ ions having a mass to charge ratio of 47 can be effectively removed. The preferred embodiment therefore enables the user to achieve extremely low detection limits for Phosphorus.

What is claimed is:

1. A mass spectrometer comprising:

an Inductively Coupled Plasma ("ICP") ion source for generating ions;

a mass filter arranged downstream of said ion source, wherein in use said mass filter is arranged to substantially transmit $P^+$ analyte ions having a first mass to charge ratio and to substantially attenuate other ions having mass to charge ratios which fall within a first range which does not include said first mass to charge ratio;

a reaction cell arranged downstream of said mass filter wherein said $P^+$ analyte ions react in use with oxygen to form $PO^+$ product ions; and a mass analyser downstream of said reaction cell, wherein said mass analyser analyses in use said $PO^+$ product ions and a determination of the intensity of said $P^+$ analyte ions is made from the mass analysis of said $PO^+$ product ions.

2. A mass spectrometer as claimed in claim 1, wherein said mass filter comprises a quadrupole mass filter.

3. A mass spectrometer as claimed in claim 1, wherein background ions having a mass to charge ratio substantially equal to said first mass to charge ratio are also transmitted by said mass filter.

4. A mass spectrometer as claimed in claim 1, wherein said product ions have a mass to charge ratio which falls within said first range.

5. A mass spectrometer as claimed in claim 1, wherein said reaction cell comprises a multipole ion guide.

6. A mass spectrometer as claimed in claim 5, wherein said multipole ion guide is arranged in a gas containment sleeve.

7. A mass spectrometer as claimed in claim 1, wherein said gas is provided at a pressure selected from the group consisting of: (i) $10^{-4}$–$10^{-2}$ mbar; (ii) $10^{-4}$–$10^{-3}$ mbar; (iii) $10^{-3}$–$10^{2}$ mbar; (iv) approximately $2\times10^{-3}$ mbar; and (v) $1.0$–$5.0\times10^{-3}$ mbar.

8. A mass spectrometer as claimed in claim 1, wherein $NO_2H^+$ ions are substantially attenuated by said mass filter prior to said $P^+$ analyte ions reacting with said gas.

9. A mass spectrometer as claimed in claim 1 comprising:

an Inductively Coupled Plasma ("ICP") ion source for generating ions;

a mass filter arranged downstream of said ion source, wherein in use said mass filter is arranged to substantially transmit analyte ions having a first mass to charge ratio and to substantially attenuate other ions having mass to charge ratios which fall within a first range which does not include said first mass to charge ratio;

a reaction cell arranged downstream of said mass filter wherein said analyte ions react in use with a gas to form product ions; and a mass analyser downstream of said reaction cell, wherein said mass analyser analyses in use said product ions and a determination of the intensity of said analyte ions is made from the mass analysis of said product ions, wherein either: (i) said analyte ions comprise $Cl^+$, said gas comprises hydrogen and said product ions comprise $Cl_2^+$; (ii) said analyte ions comprise $S^+$, said gas comprises oxygen and said product ions comprise $SO^+$; (iii) said analyte ions comprise $S^+$, said gas comprises hydrogen and said product ions comprise $SH^+$; (iv) said analyte ions comprise $S^+$, said gas comprises $C_2H_2$ and said product ions comprise $HC_2S^+$; (v) said analyte ions comprise $V^+$, said gas comprises oxygen and said product ions comprise $VO^+$; (vi) said analyte ions comprise $As^+$, said gas comprises oxygen and said product ions comprise $AsO^+$; (vii) said analyte ions comprise $F^+$, said gas comprises oxygen and said product ions comprise $OF^+$; (viii) said analyte ions comprise $F^+$, said gas comprises hydrogen and said product ions comprise $FH^+$; or (ix) said analyte ions comprise $F^+$, said gas comprises COS (carbonyl sulphide) and said product ions comprise $S^+$.

10. A mass spectrometer, comprising:

an Inductively Coupled Plasma ("ICP") ion source for generating ions;

a mass filter arranged downstream of said ion source, wherein in use said mass filter is arranged to substantially transmit $P^+$ ions having a mass to charge ratio of 31 and to substantially attenuate $NO_2H^+$ ions having a mass to charge ratio of 47;

a reaction cell arranged downstream of said mass filter wherein said $P^+$ ions react in use with oxygen to form $PO^+$ ions; and a mass analyser downstream of said gas reaction cell, wherein said mass analyser analyses in use said $PO^+$ ions and a determination of the intensity of said $P^+$ ions is made from the mass analysis of said $PO^+$ ions.

11. A method of mass spectrometry, comprising:

passing ions emitted from an Inductively Coupled Plasma ("ICP") ion source to a mass filter;

arranging said mass filter to substantially transmit $P^+$ analyte ions having a first mass to charge ratio and to substantially attenuate other ions having mass to charge ratios which fall within a first range which does not include said first mass to charge ratio;

reacting said $P^+$ analyte ions with oxygen to form $PO^+$ product ions; mass analysing said $PO^+$ product ions; and determining the intensity of said $P^+$ analyte ions from the mass analysis of said $PO^+$ product ions.

12. A method as claimed in claim 11, wherein said ions are mass filtered by a quadrupole mass filter.

13. A method as claimed in claim 11, wherein background ions having a mass to charge ratio substantially equal to said first mass to charge ratio are also transmitted by said mass filter.

14. A method as claimed in claim 11, wherein said product ions have a mass to charge ratio which falls within said first range.

15. A method as claimed in claim 11, wherein said analyte ions are reacted with said gas in a reaction cell comprising a multipole ion guide.

16. A method as claimed in claim 15, wherein said multipole ion guide is arranged in a gas containment sleeve.

17. A method as claimed in claim 11, wherein said gas is provided at a pressure selected from the group consisting of: (i) $10^{-4}$–$10^{-2}$ mbar; (ii) $10^{-4}$–$10^{-3}$ mbar; (iii) $10^{-3}$–$10^{-2}$ mbar; (iv) approximately $2\times10^{-3}$ mbar; and (v) $1.0$–$5.0\times10^{-3}$ mbar.

18. A method as claimed in claim 11, wherein $NO_2H^+$ ions are substantially attenuated by said mass filter prior to said $P^+$ analyte ions reacting with said gas.

19. A method of mass spectrometry, comprising:

passing ions emitted from an Inductively Coupled Plasma ("ICP") ion source to a mass filter;

arranging said mass filter to substantially transmit atomic ions having a first mass to charge ratio and to substantially attenuate other ions having mass to charge ratios which fall within a first range which does not include said first mass to charge ratio;

reacting said analyte ions with a gas to form product ions;

mass analysing said product ions; and determining the intensity of said analyte ions from the mass analysis of said product ions, wherein either: (i) said analyte ions comprise $Cl^+$, said gas comprises hydrogen and said product ions comprise $ClH_2^+$; (ii) said analyte ions comprise $S^+$, said gas comprises oxygen and said product ions comprise $SO^+$; (iii) said analyte ions comprise $S^+$, said gas comprises hydrogen and said product ions comprise $SH^+$; (iv) said analyte ions comprise $S^+$, said gas comprises $C_2H_2$ and said product ions comprise $HC_2S^+$; (v) said analyte ions comprise $V^+$, said gas comprises oxygen and said product ions comprise $VO^+$; (vi) said analyte ions comprise $As^+$, said gas comprises oxygen and said product ions comprise $AsO^+$; (vii) said analyte ions comprise $F^+$, said gas comprises oxygen and said product ions comprise $OF^+$; (viii) said analyte ions comprise $F^+$, said gas comprises hydrogen and said product ions comprise $FH^+$; or (ix) said analyte ions comprise $F^+$, said gas comprises COS (carbonyl sulphide) and said product ions comprise $S^+$.

20. A method of mass spectrometry, comprising:

passing ions emitted from an Inductively Coupled Plasma ("ICP") ion source to a mass filter;

arranging said mass filter to substantially transmit $P^+$ ions having a mass to charge ratio of 31 and to substantially attenuate $NO_2H^+$ ions having a mass to charge ratio of 47;

reacting said $P^+$ ions transmitted by said mass filter with oxygen in an ion guide so as to form $PO^+$ ions; and mass analysing said $PO^+$ ions.

21. A method of mass spectrometry as claimed in claim 20, further comprising determining the intensity of $P^+$ ions based upon the mass analysis of said $PO^+$ ions.

22. A mass spectrometer comprising:

an Inductively Coupled Plasma ("ICP") ion source for generating ions;

a mass filter arranged downstream of said ion source, wherein in use said mass filter is arranged to substantially transmit analyte ions having a first mass to charge ratio and to substantially attenuate other ions having mass to charge ratios which fall within a first range which does not include said first mass to charge ratio;

a reaction cell arranged downstream of said mass filter wherein said analyte ions react in use with a gas to form product ions; and a mass analyser downstream of said reaction cell, wherein said mass analyser analyses in use said product ions and a determination of the intensity of said analyte ions is made from the mass analysis of said product ion, wherein $NO_2H^+$ ions are substantially attenuated by said mass filter prior to said analyte ions reacting with said gas.

23. A method of mass spectrometry, comprising:

passing ions emitted from an Inductively Coupled Plasma ("ICP") ion source to a mass filter;

arranging said mass filter to substantially transmit atomic ions having a first mass to charge ratio and to substantially attenuate other ions having mass to charge ratios which fall within a first range which does not include said first mass to charge ratio;

reacting said analyte ions with a gas to form product ions;

mass analysing said product ions; and determining the intensity of said analyte ions from the mass analysis of said product ions, wherein $NO_2H^+$ ions are substantially attenuated by said mass filter prior to said analyte ions reacting with said gas.

* * * * *